J. WAMPACH.

Tire Cooler.

No. 80,687.

Patented Aug. 4, 1868.

Witnesses
W. C. Ashkettle
Wm. A. Morgan

Inventor
J. Wampach
per Munn & Co
Attorneys.

United States Patent Office.

JOHN WAMPACH, OF SHAKOPEE, MINNESOTA.

Letters Patent No. 80,687, dated August 4, 1868.

IMPROVEMENT IN TIRE-COOLER.

*The Schedule referred to in these Letters Patent and making part of the same.*

TO ALL WHOM IT MAY CONCERN:

Be it known that I, JOHN WAMPACH, of Shakopee, in the county of Scott, and State of Minnesota, have invented a new and improved Tire-Cooler; and I do hereby declare that the following is a full, clear, and exact description thereof, which will enable others skilled in the art to make and use the same, reference being had to the accompanying drawings, forming part of this specification.

Similar letters of reference indicate corresponding parts.

My invention has for its object to improve the construction of tire-frames, so that the tire, when set, may be instantly cooled before it can injure the felloes, and without wasting the water, which is an important consideration where water is scarce and has to be bought.

And it consists in the construction and combination of various parts of the machine, as hereinafter more fully described.

A is the frame, upon which the wheel is laid, and to which said wheel is clamped by a screw-bolt and hand-nut, said bolt passing through the hub in the ordinary manner. The frame A fits loosely in the box or tank B, which is made water-tight, and a little deeper than the frame A is high, so that, when the said frame is lowered, it may sink, and carry the wheel with it so far that the rim of the wheel may be beneath the surface of the water.

Figure 1:
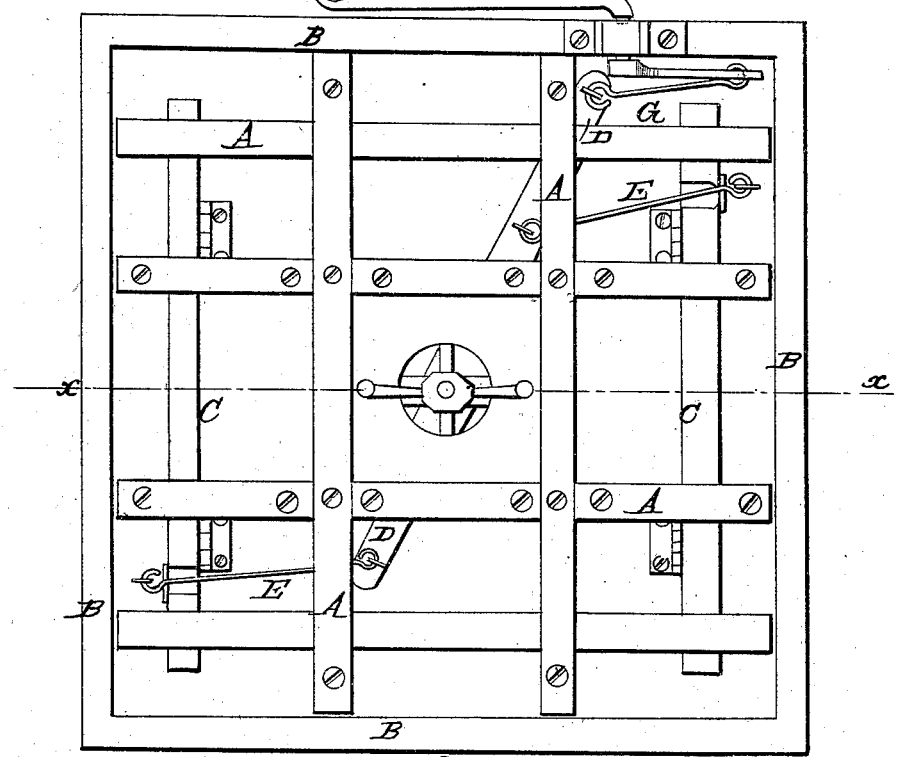
Figure 1 is a top or plan view of my improved machine.
Figure 2:
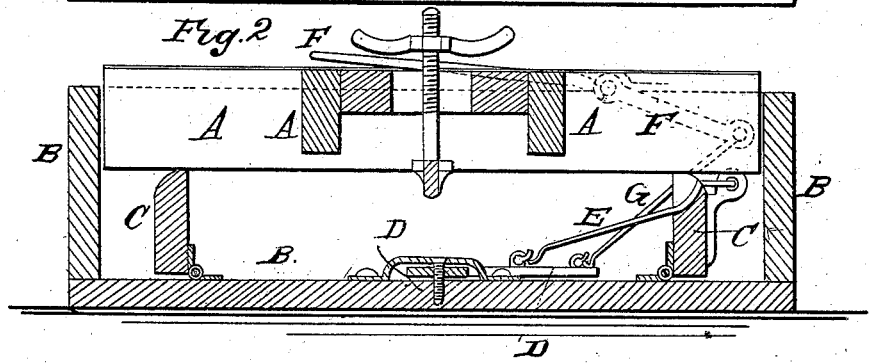
Figure 2 is a vertical cross-section of the same, taken through the line $x\ x$, fig. 1.

C are two long rectangular beams, upon which the frame A rests, and one of the edges of each of which is hinged to the bottom of the box B, so that, when the said beams C are turned down upon their sides, the frame A may sink beneath the water, and when the said beams C are turned up upon their edges, the upper part of the frame A may be raised above the surface of the water. One of the upper edges of each of the beams C is rounded off, as shown in fig. 2, to diminish the friction in raising and lowering the said beams.

D is a lever, pivoted to the bottom of the box B, or to some suitable support attached to the bottom of the said box.

E are two connecting-rods, the outer ends of which are pivoted to the beams C, and the inner ends of which are pivoted to the lever D, upon opposite sides of and at equal distances from the pivoting-point of said lever.

F is a lever, pivoted to one side of the box B, and the lower end of which is connected with the end of the lever D by the connecting-rod G, and the outer end of which extends outward and upward into such a position that it may be conveniently reached and operated to raise and lower the frame B.

In places where water is scarce, the box or tank B may be placed over two reservoirs, with which it may be connected by discharge-pipes, provided with stop-cocks, so that, should the water in the box or tank B become warm, it may be drawn off into one of said reservoirs to cool, and cold water pumped from the other reservoir into the box or tank B, to be in turn used.

I claim as new, and desire to secure by Letters Patent—

The combination of the connecting-rods E, lever D, connecting-rod G, and lever F, with each other, with the box B, beams C, and frame A, arranged substantially as herein shown and described, and for the purpose set forth.

JOHN WAMPACH.

Witnesses:
J. CASTER, Jr.,
JOHN SCHWARTZ.